United States Patent [19]

Gillingham et al.

[11] Patent Number: 4,641,737
[45] Date of Patent: Feb. 10, 1987

[54] BI-DIRECTIONAL OVERTRAVEL STOP

[75] Inventors: Gary D. Gillingham, Cherry Valley; Jeffrey D. Metcalf, Rockford, both of Ill.

[73] Assignee: Sundstrand Corporation, Rockford, Ill.

[21] Appl. No.: 804,387

[22] Filed: Dec. 4, 1985

[51] Int. Cl.$^4$ ............................................. F16D 11/04
[52] U.S. Cl. ..................... 192/141; 192/138; 192/139
[58] Field of Search ............... 192/141, 139, 138, 148, 192/144

[56] References Cited

U.S. PATENT DOCUMENTS

| | | | |
|---|---|---|---|
| 1,699,116 | 1/1929 | Noack | 192/141 X |
| 1,796,232 | 3/1931 | Barnes . | |
| 2,032,710 | 3/1936 | Minkow | 192/148 X |
| 2,080,544 | 5/1937 | Naugier | 192/148 |
| 2,502,573 | 4/1950 | Lee . | |
| 2,620,911 | 12/1952 | Krell . | |
| 2,837,925 | 6/1958 | Rowley et al. . | |
| 2,902,876 | 9/1959 | Pollock | 192/138 |
| 2,939,325 | 6/1960 | Verhoeff . | |
| 3,087,105 | 4/1963 | Hoover . | |
| 3,147,629 | 9/1964 | Michalec . | |
| 3,326,054 | 6/1967 | Canick et al. . | |
| 3,333,477 | 8/1967 | Denkowski | 192/139 X |
| 3,463,891 | 8/1969 | Fry | 192/141 X |
| 3,524,526 | 8/1970 | Denkowski | 192/141 |
| 3,650,156 | 3/1972 | Thomas . | |
| 4,064,981 | 12/1977 | House et al. . | |

Primary Examiner—Carl D. Friedman
Assistant Examiner—Creylton Smith
Attorney, Agent, or Firm—Wood, Dalton, Phillips, Mason, & Rowe

[57] ABSTRACT

An overtravel stop for a rotating shaft has a pair of gears associated with the shaft to rotate therewith. Each gear engages an associated limiting gear and the two engaged gear pairs have different gear ratios. One of the limiting gears is threaded over a shaft which is secured for rotation with the other limiting gear, such that the different gear ratios causes the one limiting gear to translate over the shaft. At selected travel limits, the one limiting gear is caused to lock relative to the other, thereby causing one of the gears associated with the shaft to shift therearound. A cam structure is provided which axially shifts a stop member associated with the shaft into engagement with a fixed stop when the one gear shifts about the shaft. Two different cam structures are shown including a pin and slot connection between the stop member and the shaft, and an ear and cam recess connection between the stop member and one of the shaft gears.

29 Claims, 8 Drawing Figures

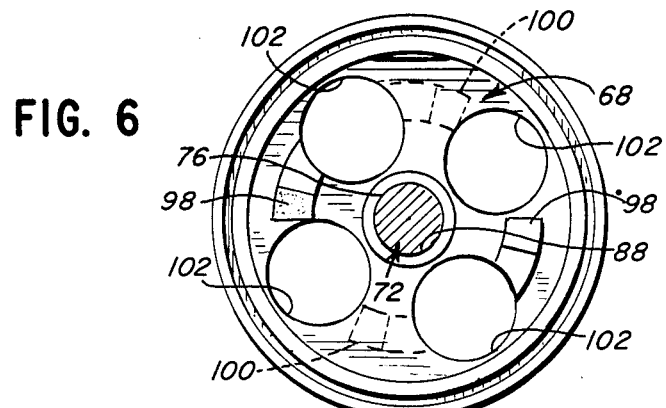
FIG. 6
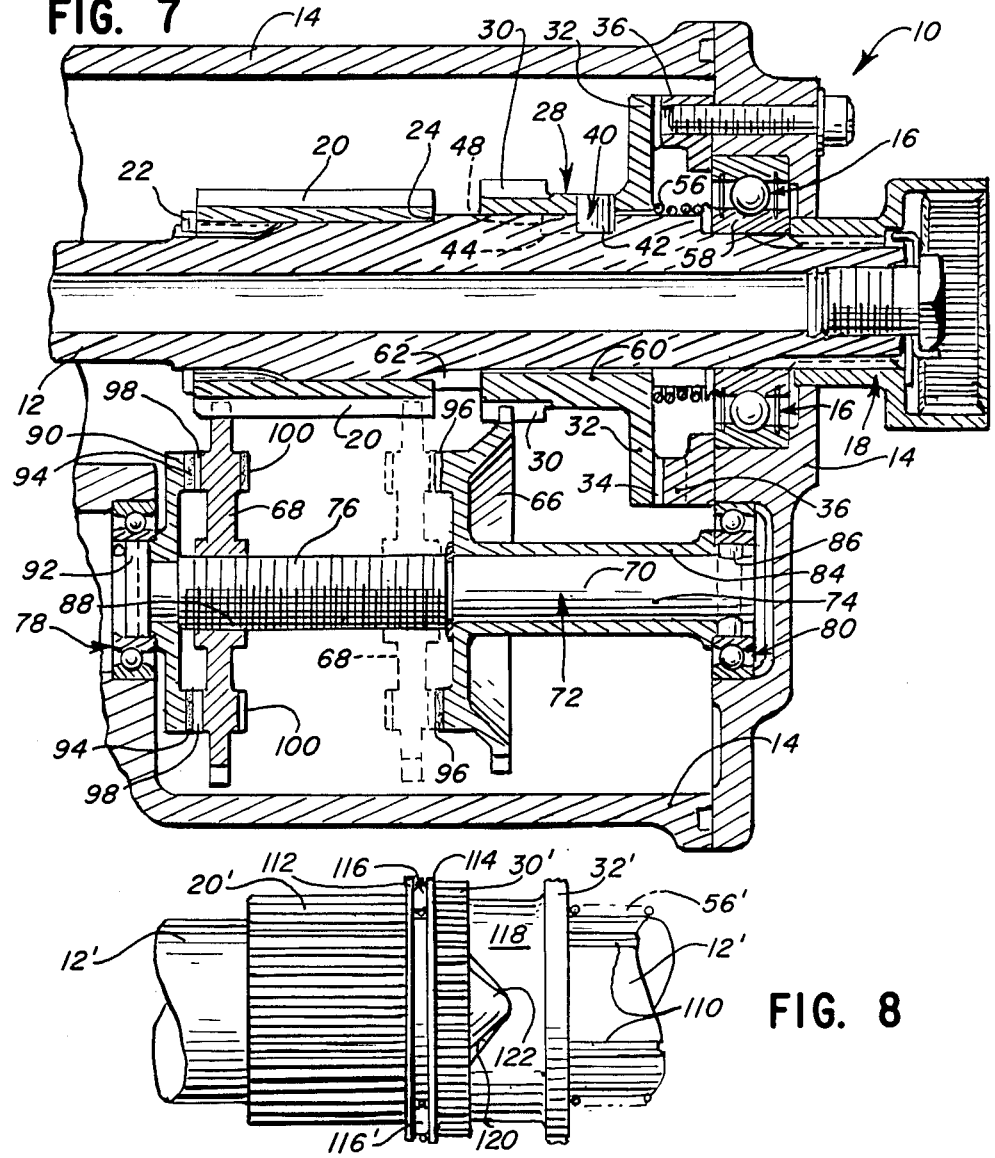
FIG. 7
FIG. 8

BI-DIRECTIONAL OVERTRAVEL STOP

DESCRIPTION

1. Technical Field

This invention relates to an overtravel stop, and more particularly to a bi-directional overtravel stop for use in limiting the rotation of an actuator. The actuator can be used for movement and positioning of aircraft components such as a flight control surface.

2. Background Art

Rotational overtravel stops are often crucial components of actuators used in environments where not only cost but also reliability, weight, size and simplicity are important. For example, where rotating actuators are used to adjust the flaps of an airplane wing, the reliability of the overtravel stops are crucial in order to prevent possible structural damage and also to prevent the flaps from being adjusted to an aerodynamically unstable position should there be a failure in the primary control for the actuator. Simplicity is also important as it helps to ensure the reliability of the stops. Of course, weight, size and power requirements are also obviously important factors with such actuators.

A number of overtravel stops have been developed in the prior art in an attempt to meet these crucial needs. For example, Pollock U.S. Pat. No. 2,902,876 and Rowley et at U.S. Pat. No. 2,837,925 disclose overtravel stops using two gear pairs with different gear ratios, one gear being over a threaded shaft and translating over that shaft, such that stops at either end of the translation are engaged to stop the main shaft. Lee U.S. Pat. No. 2,502,573 similarly uses two gear pairs having different gear ratios, where translation of one of the gears operates a device disconnecting the drive motor.

Krell U.S. Pat. No. 2,620,911 and House et al U.S. Pat. No. 4,064,981 illustrate another type of overtravel stop which uses friction brake members which are biased together at either limit of travel. These stops often require more space and weight than is desirable in those applications wherein the travel limits are separated by several thousand revolutions.

3. Disclosure of the Invention

In one aspect of the present invention, an overtravel stop for a rotating shaft is provided including a fixed stop and a stop member about the shaft and adapted for axial motion thereon to engage the fixed stop. A cam structure is provided to axially move the stop member into engagement with the fixed stop when either travel limit of the shaft is reached.

The cam structure is actuated to axially move the stop member in response to the rotational shifting of a member relative to the shaft. In one aspect of the present invention, the rotational shifting is accomplished by the use of two gear pairs having different gear ratios where one set of corresponding gears in the different pairs rotate together within the shaft travel limits, causing different relative rotation of the other two gears until the travel limits are reached.

In yet another aspect of the present invention, the cam structure comprises a pin and slot connection between the stop member and the shaft. In another aspect, the cam structure is between the stop member and one of the gears.

The present invention provides an overtravel stop which is not only low in cost but also is reliable, simple, low in weight and small in size.

BRIEF DESCRIPTION OF THE DRAWINGS

FIG. 6 is a view of one limiting gear of the present invention, taken along line 6—6 of FIG. 1;

FIG. 7 is a cross-sectional view similar to FIG. 1 but showing the overtravel stop in its limiting positions; and FIG. 8 is a view of an alternative embodiment of the barrel cam structure.

BEST MODES FOR CARRYING OUT THE INVENTION

Figure 1:
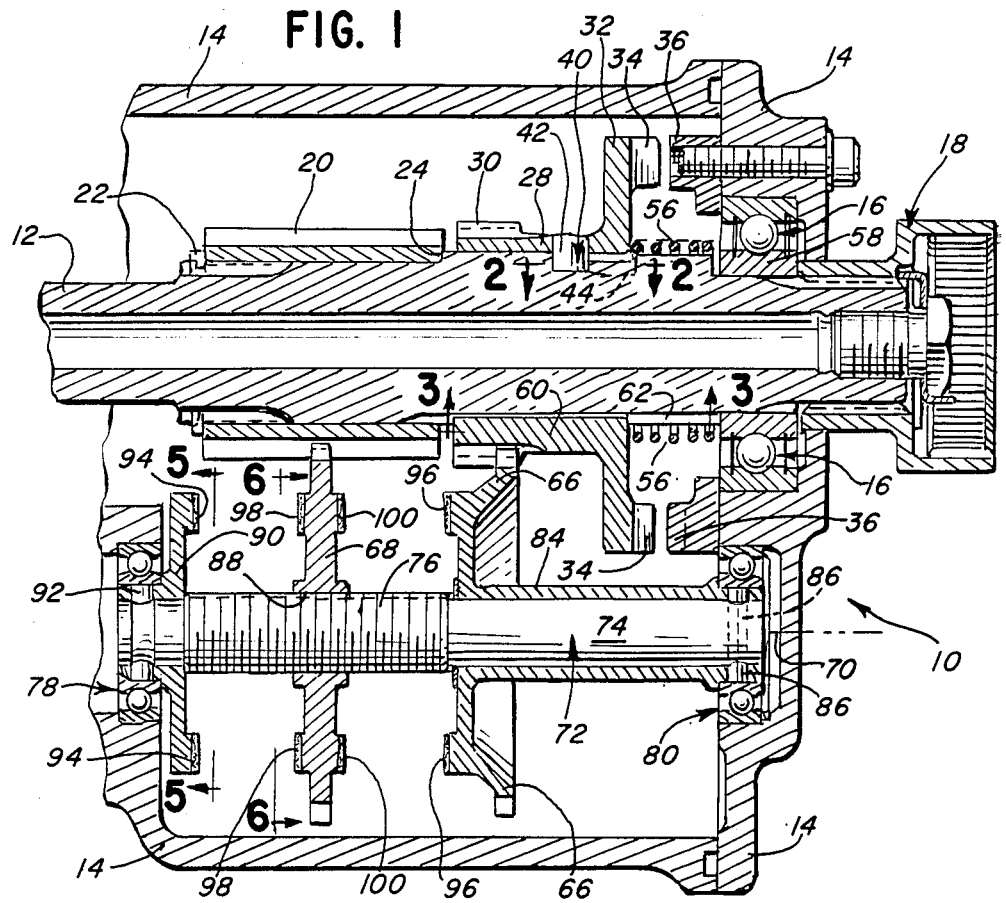
FIG. 1 is a cross-sectional view of the present invention.

The preferred embodiment of the bi-directional overtravel stop 10 for a rotary driven shaft 12 of the present invention is shown generally in FIG. 1. The overtravel stop 10 may be used in virtually any application where it is important to limit the rotation of a shaft 12, including, for example, shafts which are used to move the flaps of an aircraft wing. Any number of actuator mechanisms could be limited by this overtravel stop 10, and thus no specific mechanism is illustrated in the figures. Also, the shaft 12 shown could either be one end of an actuator shaft, or could be an auxiliary shaft which is a component of the stop 10 and is drivably connected to an actuator shaft requiring overtravel limits. The shaft 12 is suitably supported for rotation with respect to a housing 14, such support in the embodiment shown being provided by a ball bearing 16 and cap 18 structure.

A drive gear 20 is fixed to the shaft 12 for rotation therewith. The drive gear 20 extends axially along the shaft 12 (for a reason which will become apparent) and is suitably secured against axial motion, as by the lock nut 22 securing the drive gear 20 against the shaft shoulder 24 as shown. Though the drive gear 20 could, of course, be formed unitarily with the shaft 12, the above-described structure is preferable in that it allows the drive gear 20 to be changed to change the travel limits (i.e., rotational limits beyond which the shaft 12 may not be turned) imposed by the overtravel stop 10 (as will become apparent).

Adjacent the drive gear 20 is an annular member 28 which includes a shift gear 30 therearound. The annular member 28 also includes an annular flange 32 supporting axially extending stop members 34. Corresponding fixed stops 36 are suitably secured to the housing 14. The stop members 34 and fixed stops 36 shown are of a type which, when axially aligned, engage each other along axially extending faces to prevent further rotation.

Figure 2:
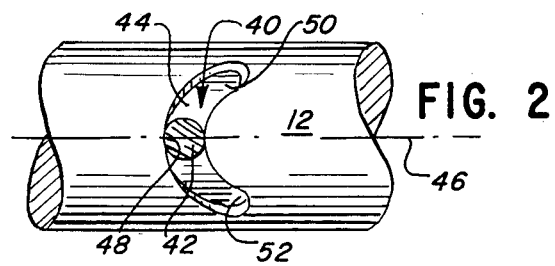
FIG. 2 is a view taken along line 2—2 of FIG. 1 showing one barrel cam structure of the present invention.

A barrel cam structure 40 secures the annular member 28 to the shaft 12. Specifically, an inwardly projecting cam pin 42 is fixed to the annular member 28 and received in a slot 44 in the shaft 12. As best shown in FIG. 2, the slot 44 is symmetrically curved about an axis 46 parallel to the shaft 12. The slot 44 includes an intermediate seat 48 and two ends 50,52 disposed such that the slot curvature is concave relative to the fixed stops 36 at the end of the shaft 12.

As will become apparent, the barrel cam structure could be similarly manufactured with the above components reversed, i.e. the pin fixed to the shaft 12 and the slot reversed and in the annular member 28.

A compression spring 56 over the shaft 12 is disposed between the inner race 58 of the ball bearing structure 16 and the annular member 28 to bias the annular member 28 to the left in FIG. 1. The compression spring 56 is strong enough so that, during normal rotation of the shaft 12, the cam pin 42 is retained in the slot seat 48 so that the annular member 28 rotates with the shaft 12.

Figures 3, 4:
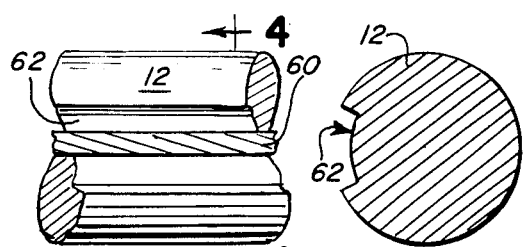
FIG. 3 is a view taken along line 3—3 of FIG. 1.
FIG. 4 is a cross-sectional view taken along line 4—4 of FIG. 3.

Limiting the rotational shifting of the annular member 28 around the shaft 12 and providing the reaction torque therebetween is a partial spline connection. Specifically, as illustrated in FIGS. 3 and 4, an inwardly projecting axial flange 60 on the annular member 28 is received in the axial slot 62 in the shaft 12. The axial slot 62 extends through less of an arc than the cam slot 44 so that this connection prevents the cam pin 42 from being shifted all the way to either slot end 50,52, thereby preventing the barrel cam structure 40 from being excessively stressed.

A pair of limiting gears 66,68 are suitably supported by the housing 14 for rotation about an axis 70 parallel to the shaft 12. Specifically, a limiting shaft 72 having a spline portion 74 and a threaded portion 76 is suitably supported for rotation, as by the ball bearing structures 78,80 shown.

The first limiting gear 66 is fixed for rotation with the limiting shaft 72 by a collar 84 having an inner spline and extending over the spline portion 74. A pin 86 is also provided which extends through the collar 84 and limiting shaft 72 to axially fix the two such that the first limiting gear 66 is axially fixed relative to the limiting shaft 72. The first limiting gear 66 engages the shift gear 30.

The second limiting gear 68 engages the drive gear 20 and has a central threaded opening 88 located over the shaft threaded portion 76.

The first limiting gear 66 and shift gear 30 have a different gear ratio than the second limiting gear 68 and the drive gear 20.

Figure 5:
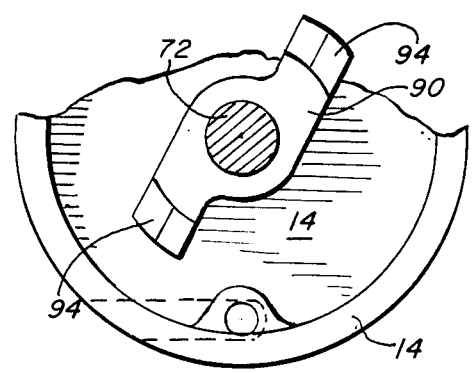
FIG. 5 is a view of a limiting stop of the present invention, taken along line 5—5 of FIG. 1.

A limiting stop member 90 is suitably secured (as by the pin 92 shown) for rotation with the limiting shaft 72 at one end of the threaded portion 76. The limiting stop member 90, which is shown in FIG. 5, includes a pair of axially projecting stops 94. The first limiting gear 66 also includes a similar pair of axially projecting stops 96 on its side facing the threaded portion 76.

As shown in FIG. 6, the second limiting gear 68 also includes axially projecting stops 98,100 on both sides, the stops 98,100 on each side being adapted to engage the facing stops 94,96 on the limiting stop member 90 and the first limiting gear 66 respectively.

The second limiting gear 68 as shown in FIG. 6 includes a number of cutout portions 102 to minimize the weight and cost of the overtravel stop 10. Similar desirable cutouts and reductions in material, though not shown, would be apparent to a skilled manufacturer of the present invention.

An alternative embodiment to the barrel cam 40 discussed above is shown in FIG. 8. In this embodiment, the drive gear 20' is fixed to the shaft 12' as with the first described embodiment, but the shift gear 30' and annular stop flange 32' are separated. Specifically, the annular stop flange 32' is suitably secured to the shaft 12' by a spline connection 110 such that it will rotate with the shaft 12' and may move axially over the shaft 12'.

The shift gear 30' is located between the drive gear 20' and the stop flange 32'. The shift gear 30' is freely rotatable over the shaft 12', though a partial spline connection such as shown in FIGS. 3 and 4 could also be provided.

The drive gear 20' and shift gear 30' have parallel annular faces 112,114 between which is located a suitable bearing structure 116 allowing free rotation of the shift gear 30' relative to the drive gear 20'.

A compression spring 56' biases the stop flange 32' against the shift gear 30' and thus secures the shift gear 30' against the bearing structure 116.

The stop flange 32' includes a collar portion 118 having a concave recess 120 therein. A curved ear 122 is fixed to the shift gear 30' and received in the concave recess 120.

Still other cam structures adapted to axially shift a stop flange 32 may also be used with the present invention. For example, the concave recess in the FIG. 8 embodiment can be associated with the shift gear and the ear associated with the stop flange. Alternatively, the stop flange and shift gear could be fixed together (as in the FIG. 1 embodiment) and a concave recess and ear structure such as shown in FIG. 8 provided between the drive gear and the shift gear. Still other cam structures will become apparent to those skilled in the art once they have had an understanding of the above-disclosed embodiments of the present invention.

INDUSTRIAL APPLICABILITY

Operation of the overtravel stop 10 will be presently described. Broadly, the shift gear 32 is caused to rotate with the shaft 12 until either of the selected shaft travel limits are reached. At either travel limit, the shift gear 30 is rotationally shifted around the shaft 12, which shifting through a cam structure 40 causes the stop flange 32 to move axially to engage a fixed stop 34 and thereby stop rotation of the shaft 12.

Specifically, operation of the first described embodiment is as follows. As the shaft 12 rotates within its travel limits, it is followed by both the drive gear 20 and the shift gear 30 (the cam pin 42 being maintained in the slot seat 48 by the spring 56).

Due to the different gear ratios involved, rotation of the drive gear 20 and shift gear 30 at the same rate causes the first and second limiting gears 66,68 to rotate at slightly different rates relative to one another. Since the first limiting gear 66 rotates with the limiting shaft 72, the second limiting gear 68 rotates at a slightly different rate than the shaft threaded portion 76 and thereby is caused to translate axially over the limiting shaft 72.

When the stops 94 and 98 (FIG. 7) or 96 and 100 (in phantom in FIG. 7) engage, the second limiting gear 68 is held against further rotation relative to the limiting shaft 72, and thus also rotates at the same rate as the first limiting gear 66. As a result, the drive gear 20 and shift gear 30 rotate at different rates and, since the drive gear 20 is fixed to the shaft 12, the shift gear 30 is rotationally shifted about the shaft 12.

Shifting of the shift gear 30 moves the cam pin 42 toward one end 50 or 52 of the cam slot 44. The curved configuration of the cam slot 44 thus biases the annular member 28 axially over the shaft 12, overcoming the biasing of the compression spring 56, so that the stop members 34 become aligned with and engage the fixed stops 36.

With the stop members 34 and fixed stops 36 engaged, the annular member 28 is held against further rotation. The shaft 12 is thus also held against further rotation by the action of the flange 60 and axial slot 62.

Reverse rotation of the shaft 12 away from the travel limit is, of course, easily accomplished without requiring any greater torque than used during normal rotation of the shaft 12. Reverse rotation can continue until the second limiting gear 68 translates across the shaft threaded portion 76 and engages the opposite stops 100 or 98.

It is apparent from the above that proper selection of gear ratios and thread pitch will set the overtravel stop 10 so that one set of stops 98 or 100 of the second limiting gear 68 will engage the stops 94, 96 respectively at selected limits of shaft rotation in either direction. The limits can also be modified by axially shifting the first limiting gear 66 over the limiting shaft 72 and suitable access (not shown) can be provided through the housing 14 to permit such shifting to be easily accomplished. Further, through the use of highly similar gear ratios and a small thread pitch, rotational limits spaced apart many thousands of revolutions can be easily provided with a relatively small overtravel stop 10.

Operation of the embodiment shown in FIG. 8 is similar to that described above except that, when the shift gear 30' is caused to shift relative to the shaft 12' and drive gear 20' at either limit, the ear 122 on the shift gear 30' engages the concave recess 122 (which does not shift, being secured to the shaft 12 by the spline connection 110) to move the stop members 34 (not shown in FIG. 8) of the stop flange 32' axially into alignment and engagement with the fixed stops 36 (also not shown in FIG. 8). This prevents further rotation of both the stop flange 32' and (through the spline connection 110) the shaft 12'.

Other aspects, objects and advantages of the invention can be obtained from a study of the drawings, the specification and the appended claims.

We claim:

1. An overtravel stop for a rotary shaft, comprising:
   a fixed stop;
   a following member about the shaft and adapted to rotate with the shaft within its selected travel limit, said following member being associated with a stop member;
   a cam structure between the shaft and the stop member, said cam structure being adapted to axially move the stop member into engagement with the fixed stop;
   means for engaging the cam structure when the following member rotationally shifts with respect to the shaft; and
   means for rotationally shifting the following member with respect to the shaft when the shaft reaches its travel limit.

2. The overtravel stop of claim 1, wherein the cam structure comprises:
   a concave recess associated with the stop member and generally symmetrical about an axis parallel to the shaft; and
   an ear secured to the following member and received within the recess.

3. The overtravel stop of claim 1, wherein the cam structure comprises a barrel cam including a pin and slot connection between the shaft and the stop member.

4. The overtravel stop of claim 3, whrein the slot is curved with a seat at one axial extreme relative to the shaft, and further comprising means biasing the stop member to locate the pin in the seat when the shaft is within its travel limit.

5. The overtravel stop of claim 1, wherein the following member is a shift gear, and the shifting means comprises:
   a drive gear fixed to the shaft;
   a first limiting gear drivably engaging the shift gear;
   a threaded shaft coaxially rotated with the first limiting gear;
   a second limiting gear drivably engaging the drive gear and having a central threaded opening over the threaded shaft, said second limiting gear and drive gear having a different gear ratio than the first limiting gear and shift gear; and
   means for stopping movement of the second limiting gear over the threaded shaft when the shaft reaches its travel limit.

6. The overtravel stop of claim 5, wherein the stopping means comprises limits fixed to the threaded shaft on opposite sides of the second limiting gear.

7. The overtravel stop of claim 5, wherein the cam structure comprises a barrel cam including a pin and slot connection between the shaft and the shift gear.

8. The overtravel stop of claim 5, wherein the stop member is secured against rotation relative to the shaft, and the cam structure is between the stop member and the shift gear.

9. The overtravel stop of claim 8, wherein the cam structure comprises:
   a concave recess in the stop member and generally symmetrical about an axis parallel to the shaft; and
   an ear secured to the shift gear and received within the recess.

10. The overtravel stop of claim 8, wherein the cam structure comprises:
    a concave recess in the shift gear and generally symmetrical about an axis parallel to the shaft; and
    an ear secured to the stop member and received within the recess.

11. An overtravel stop for a shaft, comprising:
    a first gear fixed to the shaft for rotation therewith;
    a second gear about said shaft;
    means for securing the second gear for rotation with the shaft;
    a stop member associated with the second gear and adapted for axial movement over the shaft to engage a fixed stop;
    means for axially moving the stop member toward the fixed stop upon relative rotation between the second gear and the shaft; and
    means for rotating the second gear relative to the first gear when the shaft reaches a selected travel limit.

12. The overtravel stop of claim 11, further comprising means for limiting rotation of the second gear with respect to the shaft.

13. The overtravel stop of claim 12, wherein the limiting means comprises an axial flange on the second gear, said flange being received within a slot in the shaft.

14. The overtravel stop of claim 11, wherein the axially moving means comprises a bi-directional cam between the first and second gears.

15. The overtravel stop of claim 14, wherein the cam comprises an ear projecting axially from the first gear, said ear being received in a concave recess in the second gear.

16. The overtravel stop of claim 15, wherein the securing means comprises a compression spring biasing the second gear toward the first gear to the position in which the ear is received in the bottom of the recess.

17. The overtravel stop of claim 11, wherein the axially moving means comprises a cam pin fixed to the stop member and received in a slot around the shaft, said slot being tapered toward the fixed stop.

18. The overtravel stop of claim 17, wherein the slot is arcuate with two ends and an intermediate seat, said seat being spaced further from the fixed stop than the slot ends.

19. The overtravel stop of claim 18, wherein the securing means biases the cam pin toward the seat of the arcuate slot.

20. The overtravel stop of claim 19, wherein the securing means is a compression spring.

21. The overtravel stop of claim 11, wherein the axially moving means comprises a cam between the stop member and the second gear, and further comprising a spline connection preventing relative rotation between the shaft and the stop member.

22. the overtravel stop of claim 21, wherein the cam comprises an ear projecting axially from the second gear, said ear being received in a concave recess in the stop member.

23. The overtravel stop of claim 22, wherein the securing means comprises a compression spring biasing the stop member toward the second gear to the position in which the ear is received in the bottom of the recess.

24. The overtravel stop of claim 11, wherein the rotating means comprises:
 a threaded shaft secured to coaxially rotate with a first limiting gear engaging the second gear;
 a second limiting gear engaging the first gear and having a central threaded opening over the threaded shaft, the second limiting gear and the first gear having a different gear ratio than said first limiting gear and said second gear; and
 means for limiting movement of the second limiting gear over the threaded shaft to rotationally lock the first limiting and second limiting gears together at a selected movement limit, whereby the movement limit is reached substantially when the shaft reaches its travel limit.

25. The overtravel stop of claim 24, wherein the limiting means locks the first limiting and second limiting gears together at either of two selected movement limits which are reached substantially when the shaft reaches respective selected travel limits in either direction of rotation.

26. A bi-directional overtravel stop for a main shaft, comprising:
 a fixed stop;
 a first gear fixed on the main shaft;
 a second gear about the main shaft;
 a stop member secured to the second gear;
 a cam structure adapted to secure the second gear for rotation with the main shaft when the main shaft is within its travel limits and to shift the second gear axially to engage the stop member with the fixed stop when the second gear rotationally shifts relative to the main shaft;
 a threaded shaft parallel to the main shaft and secured to rotate with a first limiting gear engaging the second gear;
 a second limiting gear with a central threaded opening over the threaded shaft, said second limiting gear engaging the first gear and said second limiting gear and first gear having a different gear ratio than said first limiting gear and said second gear; and
 gear stops fixed to the threaded shaft on opposite sides of the second limiting gear and adapted to stop the second limiting gear with respect to the first limiting gear when either shaft travel limit is reached.

27. The overtravel stop of claim 26, wherein the stop member is secured to allow axial motion only relative to the main shaft and the cam structure comprises:
 a concave recess in the stop member;
 an ear projecting axially from the second gear and received in the concave recess; and
 means for axially biasing the stop member over the main shaft to seat the ear in the concave recess.

28. The overtravel stop of claim 26, wherein the cam structure comprises a barrel cam including a pin and slot connection between the main shaft and second gear, the slot being curved with a seat at one axial extreme relative to the main shaft.

29. The overtravel stop of claim 28, further comprising means for biasing the second gear to locate the pin in the slot seat when the main shaft is within its travel limits.

* * * * *